US011964499B2

(12) United States Patent
Tsubaki

(10) Patent No.: US 11,964,499 B2
(45) Date of Patent: Apr. 23, 2024

(54) LIQUID DISCHARGE HEAD ANGLE ADJUSTER, LIQUID DISCHARGE MODULE, AND LIQUID DISCHARGE APPARATUS

(71) Applicant: Kengo Tsubaki, Kanagawa (JP)

(72) Inventor: Kengo Tsubaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/868,792

(22) Filed: Jul. 20, 2022

(65) Prior Publication Data

US 2023/0034705 A1 Feb. 2, 2023

(30) Foreign Application Priority Data

Jul. 28, 2021 (JP) ................................ 2021-123639

(51) Int. Cl.
*B41J 25/316* (2006.01)

(52) U.S. Cl.
CPC .................................. *B41J 25/316* (2013.01)

(58) Field of Classification Search
CPC ...................................................... B41J 25/316
See application file for complete search history.

(56) References Cited

U.S. PATENT DOCUMENTS

2004/0112231 A1 6/2004 Mori et al.
2008/0302259 A1 12/2008 Katoh et al.
2011/0050814 A1 3/2011 Tsubaki et al.
2011/0181670 A1 7/2011 Tsubaki
2012/0062659 A1 3/2012 Tsubaki
2013/0235131 A1 9/2013 Watanabe et al.
2014/0063141 A1 3/2014 Tsubaki et al.
2015/0076124 A1 3/2015 Tsubaki et al.
2015/0258815 A1 9/2015 Tsubaki et al.
(Continued)

FOREIGN PATENT DOCUMENTS

JP 10-235965 9/1998
JP 2001307312 A * 11/2001
(Continued)

OTHER PUBLICATIONS

Nishima, Machine TranslationofJP-2001307312-A, 2001 (Year: 2001).*
(Continued)

*Primary Examiner* — Scott A Richmond
(74) *Attorney, Agent, or Firm* — XSENSUS LLP

(57) ABSTRACT

A liquid discharge head angle adjuster for individually adjusting inclination angles of a plurality of liquid discharge heads includes a plurality of array members and a plurality of array supports. The plurality of array members holds the liquid discharge heads. The plurality of array supports the array members. At least one of the array supports includes a first support, a second support, and a pressing member. The first support is disposed on one side in a direction in which one of the liquid discharge heads is rotated when an inclination angle of the one of the liquid discharge heads is adjusted. The first support supports a rotation fulcrum of one of the array members. The second support is disposed on a side opposite the first support, and supports another of the array member. The pressing member presses the rotation fulcrum against the first support.

17 Claims, 13 Drawing Sheets

(56) References Cited

U.S. PATENT DOCUMENTS

| | | | | |
|---|---|---|---|---|
| 2016/0096377 | A1 | 4/2016 | Katoh et al. | |
| 2019/0061396 | A1 | 2/2019 | Suzuki | |
| 2019/0077158 | A1 | 3/2019 | Tsubaki | |
| 2019/0143721 | A1 | 5/2019 | Urakami | |
| 2020/0101777 | A1* | 4/2020 | Suzuki | B41J 25/001 |
| 2021/0162784 | A1 | 6/2021 | Tsubaki | |
| 2022/0169055 | A1 | 6/2022 | Tsubaki | |

FOREIGN PATENT DOCUMENTS

| | | | |
|---|---|---|---|
| JP | 2013-052526 | A | 3/2013 |
| JP | 2019-038231 | | 3/2019 |
| JP | 2019-142030 | | 8/2019 |
| JP | 2020-055293 | A | 4/2020 |
| JP | 2022-085395 | | 6/2022 |

OTHER PUBLICATIONS

Extended European Search Report dated Dec. 5, 2022 in European Patent Application No. 22184949.0, 9 pages.

* cited by examiner

LIQUID DISCHARGE HEAD ANGLE ADJUSTER, LIQUID DISCHARGE MODULE, AND LIQUID DISCHARGE APPARATUS

CROSS-REFERENCE TO RELATED APPLICATION

This patent application is based on and claims priority pursuant to 35 U.S.C. § 119 to Japanese Patent Application No. 2021-123639, filed on Jul. 28, 2021, in the Japan Patent Office, the entire disclosure of which is hereby incorporated by reference herein.

BACKGROUND

Technical Field

Exemplary aspects of the present disclosure relate to a liquid discharge head angle adjuster, a liquid discharge module, and a liquid discharge apparatus.

Related Art

An apparatus including a plurality of liquid discharge heads that discharge different types of liquid is known as a liquid discharge apparatus for discharging liquid to a medium. Examples of such different types of liquid include liquid ink of different colors.

An apparatus including an angle adjuster that adjusts an angle of each liquid discharge head relative to a drum-shaped member that conveys a medium is known. The angle adjuster is disposed above the drum-shaped member, and includes a plurality of liquid discharge heads disposed along a conveyance direction of the medium.

SUMMARY

In at least one embodiment of this disclosure, there is described an improved liquid discharge head angle adjuster for individually adjusting inclination angles of a plurality of liquid discharge heads. The liquid discharge head angle adjuster includes a plurality of array members and a plurality of array supports. The plurality of array members holds the liquid discharge heads. The plurality of array supports support the array members, and at least one of the plurality of array supports includes a first support, a second support, and a pressing member. The first support is disposed on one side in a direction in which one of the liquid discharge heads is rotated when an inclination angle of the one of the liquid discharge heads is adjusted. The first support supports a rotation fulcrum of one of the array members. The second support is disposed on a side opposite the first support, and supports another of the array members. The pressing member presses the rotation fulcrum against the first support.

Further described is an improved liquid discharge module that includes the liquid discharge head angle adjuster described above, and the plurality of liquid discharge heads to discharge liquid to a medium.

Still further described is an improved liquid discharge apparatus that includes the liquid discharge head angle adjuster described above, a drum to convey a medium, and the plurality of liquid discharge heads. The plurality of liquid discharge heads is disposed on an outer circumferential surface of the drum, and discharges liquid to the medium.

BRIEF DESCRIPTION OF THE DRAWINGS

The aforementioned and other aspects, features, and advantages of the present disclosure are better understood by reference to the following detailed description when considered in connection with the accompanying drawings, wherein.

Figure 1:
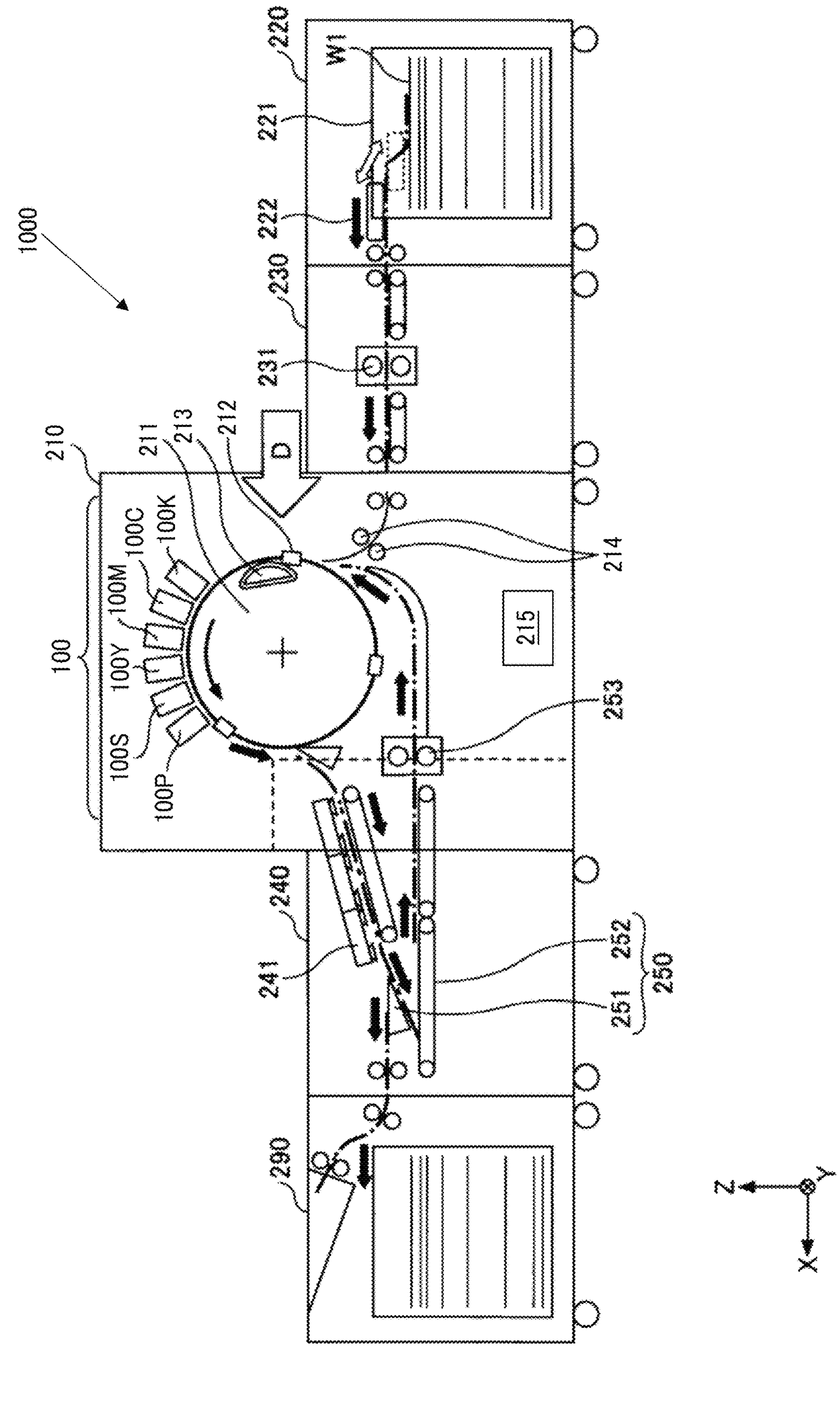
FIG. 1 is a schematic diagram illustrating a general arrangement of an image forming apparatus to which a liquid discharge apparatus according to one embodiment of the present disclosure is applied.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described with reference to the drawings. First, a description is given of a configuration of an inkjet printer 1000 as one example to which a liquid discharge apparatus according to an embodiment of the present disclosure is applied.

General Arrangement of Inkjet Printer 1000

FIG. 1 is a diagram illustrating a general arrangement of the inkjet printer 1000. The inkjet printer 1000 is, for example, an image forming apparatus employing an on-demand line scanning system, and includes an image forming device 210, a sheet feeding device 220, a registration adjuster 230, a drying device 240, a recording medium reverse device 250, and a sheet ejection device 290. Next, a description is given of one example of a series of image formation output operations (printing operations) performed by the inkjet printer 1000 including such configurations. The image forming device 210 corresponds to the liquid discharge apparatus according to the embodiment of the present disclosure.

First, sheets W1 as recording media stacked on a sheet stacker 221 disposed in the sheet feeding device 220 are picked up one by one by an air separator 222, and the picked-up sheet W1 is conveyed to a direction toward the image forming device 210. When the sheet W1 conveyed from the sheet feeding device 220 reaches the registration adjuster 230, a skew of the sheet W1 with respect to a conveyance direction is corrected by a registration roller pair 231 disposed inside the registration adjuster 230.

The sheet W1 (the registration of which has been) corrected by the registration roller pair 231 is fed to the image forming device 210. Then, the sheet W1 is fed to a surface of a tubular drum 211 by a conveyance roller pair 214. The drum 211 includes a plurality of recoding medium grippers 212. A leading end of the fed sheet W1 is nipped by one of the grippers 212, and the sheet W1 is conveyed to a position opposite a plurality of head arrays 100 (100K through 100P) by rotation of the drum 211.

The plurality of head arrays 100 discharges liquid ink by an inkjet method. In the image forming device 210, the plurality of head arrays 100 is disposed along a surface of the tubular drum 211 in a rotation direction of the drum 211 in a state in which the plurality of head arrays 100 is filled with predetermined-color ink. Each of the head arrays 100 is disposed in a predetermined radial position according to a curvature of an outer circumferential surface of the drum 211. An angle of each of the head arrays 100 is adjusted such that a liquid discharge direction is perpendicular to the surface of the drum 211. That is, in a radial direction from a rotation axis of the drum 211, each of the head arrays 100 is disposed at a different angle.

In other words, the plurality of head arrays 100 as a liquid discharge module has angles with respect to the drum 211, and each of the angles is adjusted toward the rotation center of the drum 211 such that the head arrays 100 discharge ink (liquid) to an outer circumferential surface of the sheet W1 retained on the surface of the drum 211.

In addition, a dummy discharge receptacle 213 is disposed on the outer circumferential surface of the drum 211. The dummy discharge receptacle 213 receives ink that is dummy-discharged when the head arrays 100 are not discharging ink to the sheet W1. Upon image formation, the sheet W1 is conveyed to the drying device 240.

The drying device 240 includes a dryer 241. The sheet W1 passes below the dryer 241, so that moisture of the sheet W1 evaporates. The drying device 240 also includes the recording medium reverse device 250 including a recording medium reverse device 251. If duplex printing is performed, the sheet W1 is reversed by the recording medium reverse device 250, and then is conveyed again toward a direction of the image forming device 210 by a reverse conveyance device 252. Before the sheet W1 reaches the drum 211, a skew of the sheet W1 is corrected by a registration roller 253 disposed inside the image forming device 210. The sheet W1 which has been dried by the drying device 240 is conveyed to the sheet ejection device 290, and is stacked in a state in which an end of the sheet W1 is aligned.

The image forming device 210 includes an image forming controller 215 that partially controls a liquid discharge operation performed by the image forming device 210. However, the image forming controller 215 may comprehensively control operations of the inkjet printer 1000. Alternatively, the sheet feeding device 220, the registration adjuster 230, and the drying device 240 may separately include controllers. In such a case, cooperation of the image forming controller 215 with the controllers can comprehensively control operations of the inkjet printer 1000.

As illustrated in FIG. 1, a conveyance direction of the sheet W1 is a direction X. A rotation direction of the drum 211 which conveys the sheet W1 when an image forming process is executed is a counter clockwise (CCW) direction on an X-Z plane.

Embodiment of Liquid Discharge Head Angle Adjuster

Figure 2:
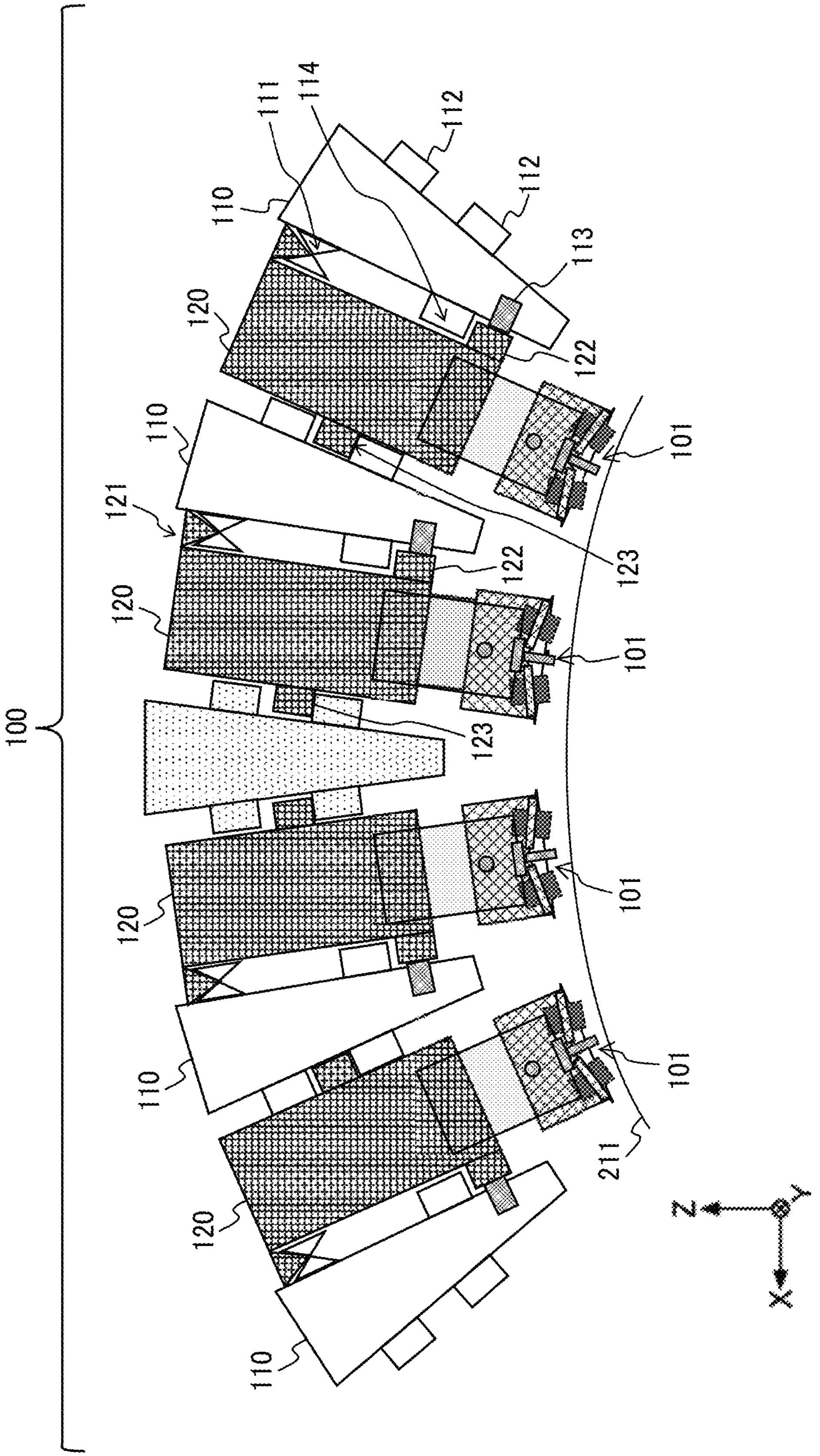
FIG. 2 is a diagram illustrating a configuration of a liquid discharge head according to one embodiment of the present disclosure.

Next, a liquid discharge head angle adjuster 500 according to an embodiment of the present disclosure is described. FIG. 2 is an enlarged view of the plurality of head arrays 100. As illustrated in FIG. 2, the head arrays 100 include a plurality of array members 120 and a plurality of flanges 110 as array supports. The array members 120 fix discharge heads 101, and the flanges 110 support the array members 120. As illustrated in FIG. 2, in the head arrays 100, each of the plurality of discharge heads 101 is supported at a different angle. An inclination angle of each discharge head 101 is adjusted to a radial direction that passes a rotation axis of the drum 211. That is, an inclination angle of each array member 120 is maintained such that a direction perpendicular to a tangent of a position in which liquid ink discharged from the corresponding discharge head 101 lands on the drum 211 is a discharge direction.

In the head arrays 100, the discharge heads 101 are supported in positions opposite an outer circumferential surface (a surface on which the sheet W1 is held and conveyed) of the drum 211 in a state in which the discharge heads 101 are sequentially disposed in a direction along the outer circumferential surface. Thus, the flanges 110 and the array members 120 are also sequentially disposed in the direction along the outer circumferential surface.

The discharge heads 101 are configured to discharge respective liquid ink of black (K), cyan (C), magenta (M), and yellow (Y) for color printing. In addition, certain discharge heads 101 discharge special color ink (S) and coating liquid (P) that coats a sheet W1 to which liquid is to adhere. In the following description, only the discharge heads 101 for liquid ink (K, C, M, Y) of four colors are described.

The head arrays 100 include the flanges 110 and the array members 120. The flanges 110 and the array members 120 serve as a liquid discharge head angle adjuster 500 that adjusts a liquid discharge direction for each of the discharge heads 101. The liquid discharge head angle adjuster 500 is configured such that the array member 120 is supported by the flanges 110 at a predetermined angle. The angle adjustment is made such that a discharge direction of the discharge head 101 is set on a virtual axis line perpendicular to and toward an outer circumferential surface from the rotation center of the drum 211. In other words, a vertical axis line of the array member 120 (in a virtual radial direction passing through the rotation center of the drum 211) is adjusted to an angle to pass through the rotation center of the drum 211.

The flange 110 as the array support includes a V roller 111 as a first support, a pressing flat roller 114 as a pressing member, and an adjustment roller 113 that are disposed on one surface of the flange 110 out of the front surface and the back surface of the flange 110 in the rotation direction of the drum 211 (the conveyance direction of the sheet W1). The V roller 111, the adjustment roller 113, and the pressing flat roller 114 are disposed on the same surface of the flange 110. On the other surface of the flange 110, a support flat roller 112 as a second support is disposed.

The V roller 111 supports a V rail 121 that is described below. Each of the V roller 111 and the V rail 121 has a V-shaped longitudinal section in a rotation axis direction of the drum 211. Thus, the V roller 111 has two inclined surfaces that face each other, and an intersection point of the inclined surfaces is a tip. Moreover, the V rail 121 has two inclined surfaces that face each other, and an intersection point of the inclined surfaces is a bottom portion. The tip of the V roller 111 contacts the bottom portion of the V rail 121, and such a contact functions as a fulcrum for rotation when an angle of the array member 120 is adjusted. The angle adjustment is described below.

The pressing flat roller 114 as the pressing member has a configuration by which an urging force for pressing the tip of the V roller 111 against the bottom portion of the V rail 121 is applied to the V roller 111. The urging force by the pressing flat roller 114 can prevent a phenomenon in which the fulcrum provided by the V rail 121 and the V roller 111 is lifted due to a difference in positions of the centers of gravity.

The adjustment roller 113 functions as an angle adjustment device that pushes an adjustment flat rail 122 disposed in the array member 120 to adjust an inclination angle of the array members 120.

The support flat roller 112 restricts a rotation of the array member 120, and supports the array member 120 to be held at a predetermined inclination angle. The phrase "rotation of the array member 120" used herein represents a rotation of the array member 120 by its own weight about the V roller 111 as a first fulcrum.

The flanges 110 are fixed to a wall surface (e.g., a side plate) of a casing in which a structure including the head arrays 100 are stored. As illustrated in FIG. 2, fixation positions of the flanges 110 are predetermined positions spaced a certain distance apart in a rotation direction (a main scanning direction) of the drum 211. The array member 120 is laid across the flanges 110 fixed to the predetermined positions, so that the array member 120 remains at a predetermined inclination angle with respect to a predetermined radial direction of the drum 211.

The array member 120 as an angle adjusted device is a long member. A longitudinal direction of the array member 120 is a rotation axis direction of the drum 211. The array member 120 has a surface opposite the drum 211, and the discharge head 101 is fixed to such a surface of the array member 120. The array member 120 includes the V rail 121 as a first supported portion and the adjustment flat rail 122 on one surface out of the front surface and the rear surface in the rotation direction of the drum 211 (the conveyance direction of the sheet W1). The array member 120 includes a supported flat rail 123 as a second supported portion on the other surface.

The V rail 121 of the array member 120 is laid across the V roller 111 of the flange 110. Moreover, the supported flat rail 123 disposed on the surface at a side opposite the V rail 121 is laid across the support flat roller 112. The adjustment flat rail 122 on the same surface as the V rail 121 is disposed in a position that is to be pushed by the adjustment roller 113.

The adjustment roller 113 has a structure by which an amount of projection of the adjustment roller 113 from a side surface of the flange 110 is variable. If a projection amount of the adjustment roller 113 becomes greater, the adjustment flat rail 122 is pushed more by the adjustment roller 113. Herein, the position in which the tip of the V rail 121 is in contact with the V roller 111 becomes a rotation fulcrum, so that a lower end side of the array member 120 to which the discharge head 101 is fixed rotates in the same direction as the rotation direction of the drum 211. Accordingly, a position of the discharge head 101 moves in the rotation direction of the drum 211, and a liquid ink discharge direction can be adjusted to an angle toward the rotation axis of the drum 211.

As illustrated in FIG. 2, the head arrays 100 disposed upstream in the conveyance direction and the head arrays 100 disposed downstream in the conveyance direction are inclined in opposite directions relative to a boundary that is in a position of a vertical diameter of the drum 211. For example, the head arrays 100 disposed upstream in the conveyance direction are "inclined rightward", and the head arrays 100 disposed downstream in the conveyance direction are "inclined leftward".

The flanges 110 inclined rightward are configured such that the V rail 121 and the adjustment flat rail 122 on a lower side of the inclination are respectively caught by the V roller 111 and the adjustment roller 113 of the flange 110 disposed upstream in the conveyance direction. Moreover, the supported flat rail 123 on the opposite surface is configured to be caught by the support flat roller 112 of the flange 110 disposed downstream in the conveyance direction. On the other hand, the flanges 110 inclined leftward are symmetric with respect to the flanges 110 inclined rightward.

Angle Adjustment Method

Figure 3:
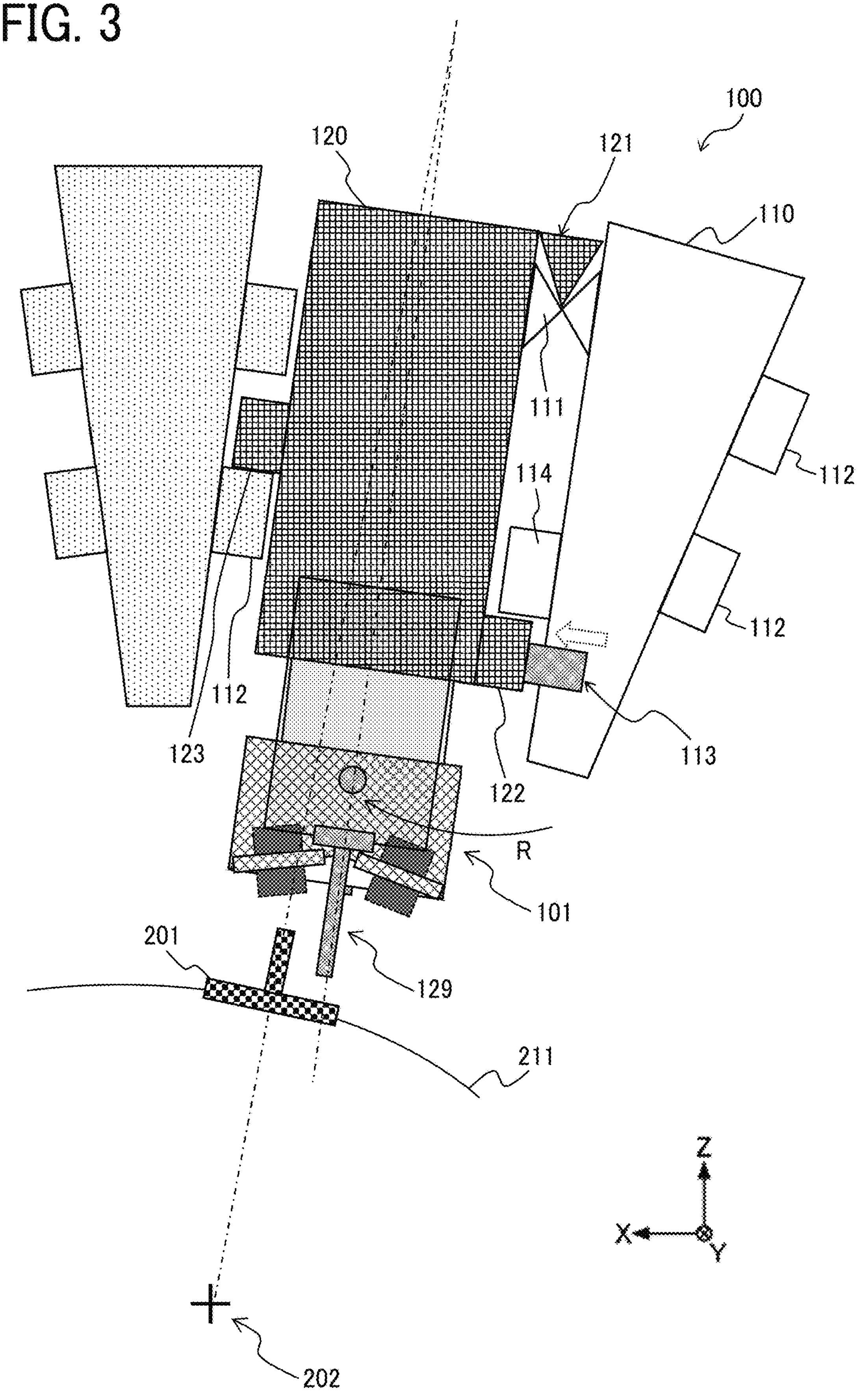
FIG. 3 is a diagram illustrating a configuration of a liquid discharge head angle adjuster according to one embodiment of the present disclosure.
Figure 4:
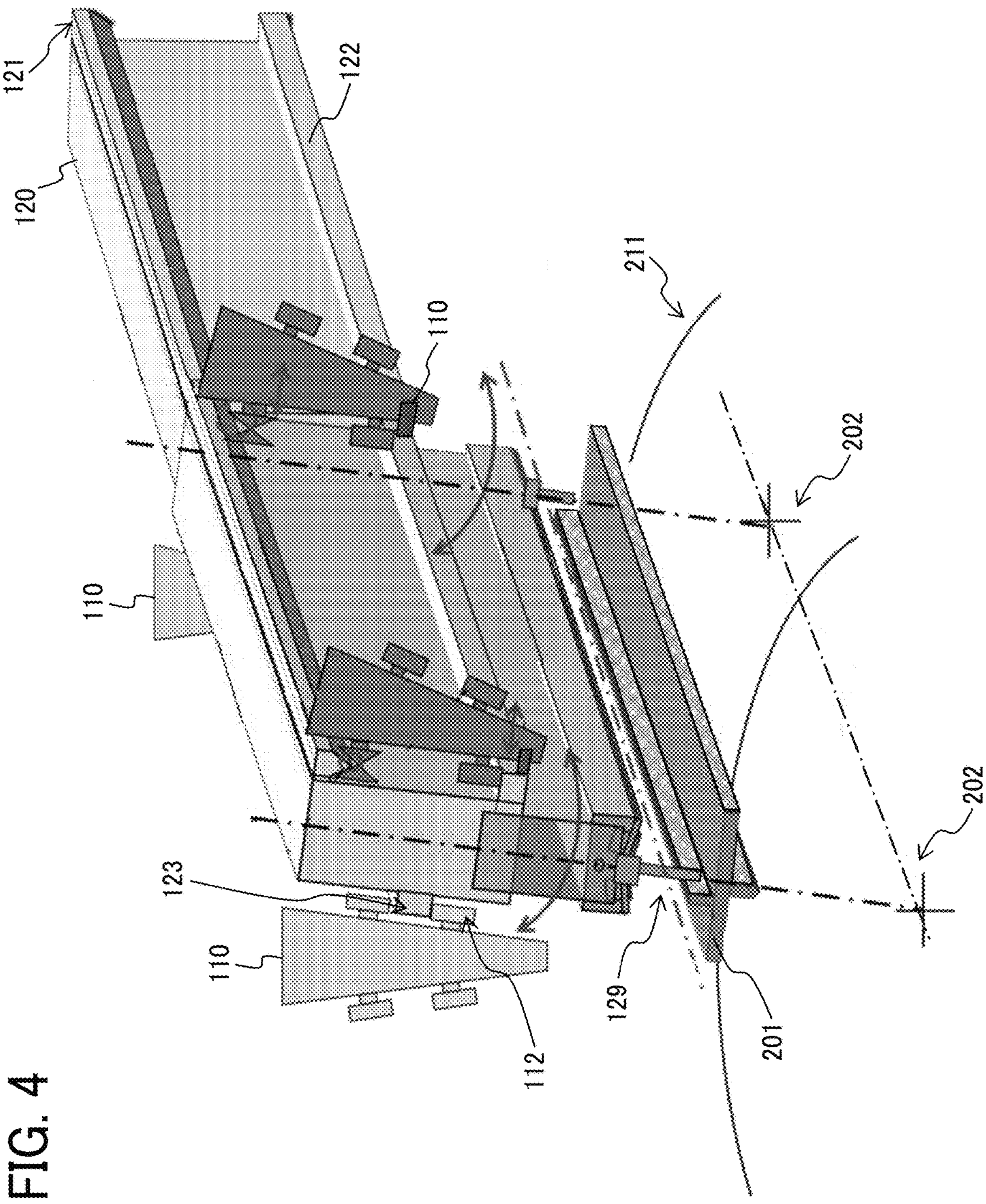
FIG. 4 is a perspective view illustrating one portion of the liquid discharge head angle adjuster according to one embodiment.

As for an angle adjustment method for the discharge head 101, an example of an axial-center adjustment method for the array member 120 is described. FIG. 3 is a front view partially illustrating the head arrays 100. Similarly, FIG. 4 is a schematic view partially illustrating the head arrays 100.

As illustrated in the example in FIG. 3, if attention is focused on one of the discharge heads 101 in the head arrays 100, the V rail 121 and the adjustment flat rail 122 are disposed on one side surface of the array member 120 in the conveyance direction, and only the supported flat rail 123 is disposed on the other side surface of the array member 120. A discharge array to be described in the following description is inclined rightward.

When the discharge array is inserted between the flanges 110 and installed in a liquid discharge module, that is, when the discharge array slides in a direction Y and a position of the discharge array is determined, a weight of the discharge array causes a vertical axis line to shift relative to the rotation center of the drum 211 as illustrated in FIG. 3. In a case where an operation continues in such a state, a distance (a discharge gap) between the discharge head 101 and the sheet W1 to be conveyed by the drum 211 differs for each discharge head 101. In this case, an attachment position (a landing position) of liquid discharged from the discharge head 101 to the sheet W1 is shifted from an expected position. As a result, quality of an image to be formed with the liquid ink is affected.

Accordingly, as illustrated in FIG. 3, a projection amount of the adjustment roller 113 is adjusted, so that an end portion of the array member 120 on the side of the drum 211 is moved. Herein, the tip of the V rail 121 of the array member 120 is in contact with the V roller 111, and such a tip in contact with the V roller 111 functions as a rotation fulcrum. Such a rotation indicated by arrow R in FIG. 3 enables an inclination angle to be adjusted such that a vertical axis line of the array member 120 is oriented toward the rotation center (a drum center 202) of the drum 211.

More particularly, a clearance between a side surface of a vibration restriction pin 129 disposed on a lower surface of the array member 120 and a jig 201 disposed on a surface of the drum 211 is adjusted to a predetermined value. The predetermined value is, for example, 0.05 mm or less.

Moreover, as illustrated in FIG. 4, if a vertical axis line of the array member 120 is adjusted so as to be oriented toward the drum center 202 of the drum 211, a virtual line connecting a plurality of vibration restriction pins 129 disposed in the front and the rear (a Y-axis direction) of the array member 120 and a rotation axial line of the drum 211 become parallel.

Herein, the head array 100 is configured such that a clearance between each of the plurality of vibration restriction pins 129 and the jig 201 becomes the predetermined value as described above.

Structure of Array Member 120

Figure 5A:
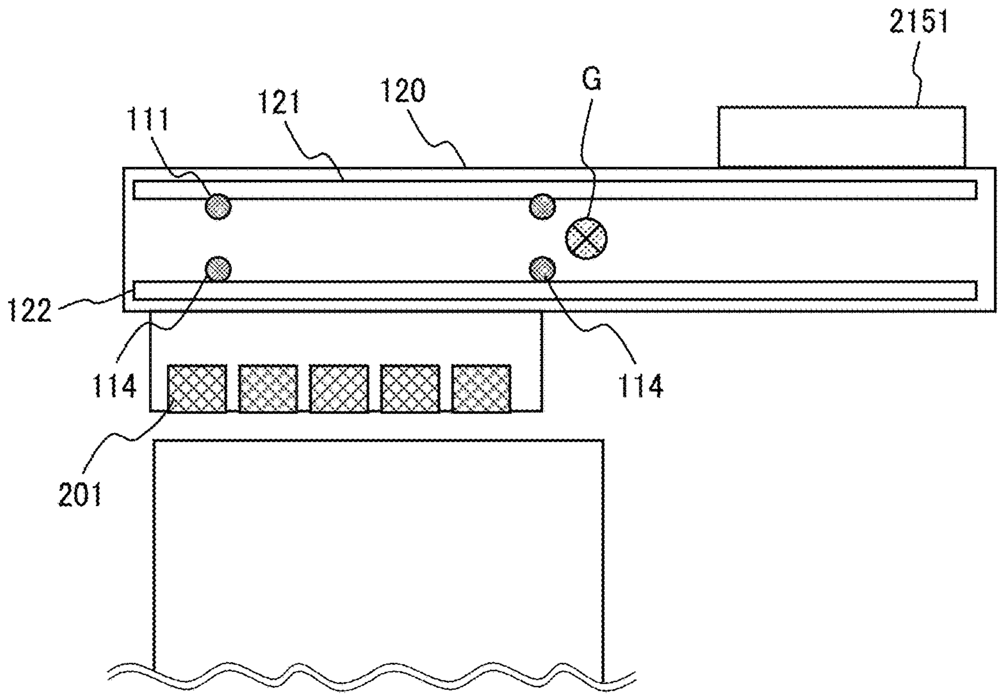
FIGS. 5A and 5B are diagrams each illustrating a comparative example of a liquid discharge head angle adjuster.
Figure 5B:
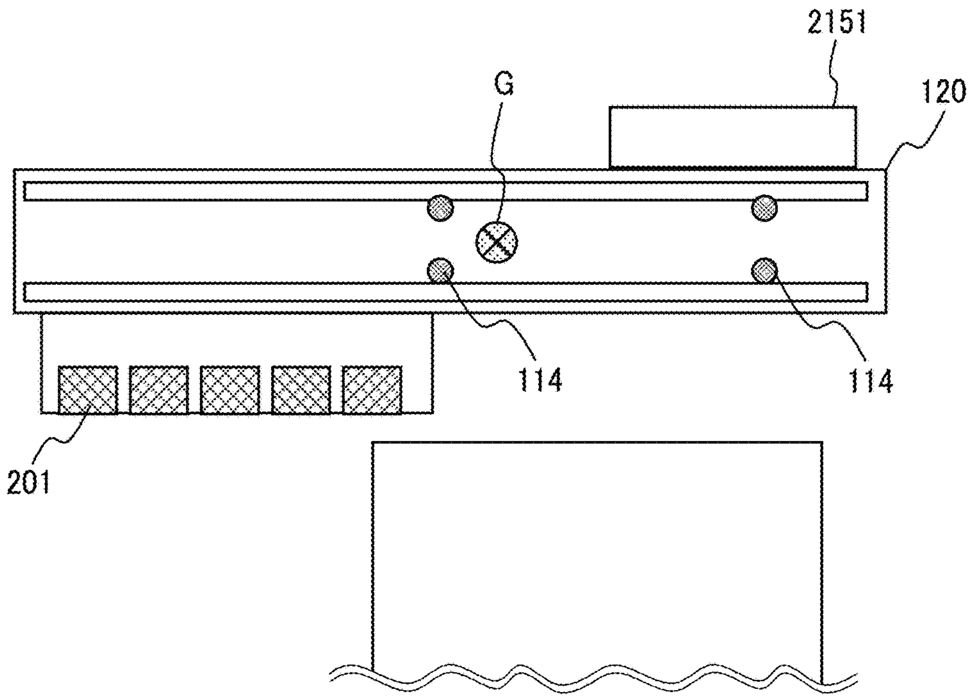

Next, a configuration of the array member 120 is further described in detail. Each of FIGS. 5A and 5B is a side view of the array member 120. The left side and the right side of each of FIGS. 5A and 5B are respectively the front side and the rear side of the head array 100. In each of FIGS. 5A and 5B, general arrangement of the flange 110 is omitted, and only a configuration functioning as a support that supports the array member 120 is illustrated.

As illustrated in FIGS. 5A and 5B, the array member 120 is a long member in a width direction of the drum 211 (the width direction of the drum 211 is a direction that is perpendicular to the conveyance direction and also referred to as a main scanning direction). The discharge head 101 is disposed on the lower surface in one end portion (in the front direction) of the array member 120. Moreover, a component such as a power circuit and a control board 2151 that controls operations of the discharge head 101 is disposed on an upper surface in the other end portion (the rear side) that is a side opposite the position of the discharge head 101.

The array member 120 is supported in a predetermined position by the support flat roller 112 and the V roller 111 of the flanges 110 disposed in the width direction of the drum 211. In the width direction of the drum 211, a plurality of V rollers 111 and a plurality of support flat rollers 112 are disposed. The flange 110 is disposed in a position within a range of width direction size of the drum 211.

As illustrated in FIG. 5A, if the array member 120 is inserted between the flanges 110 so that the array member 120 is supported by the flanges 110 and functions, a front portion and a middle portion of the V rail 121 are supported by the V rollers 111.

Moreover, as illustrated in FIG. 5B, if the array member 120 is pulled out toward the front side of the drum 211, the middle portion and a rear portion of the V rail 121 are supported by the V rollers 111.

A clearance of 1 mm or less is arranged between the support flat roller 112 and the supported flat rail 123.

Figure 6:
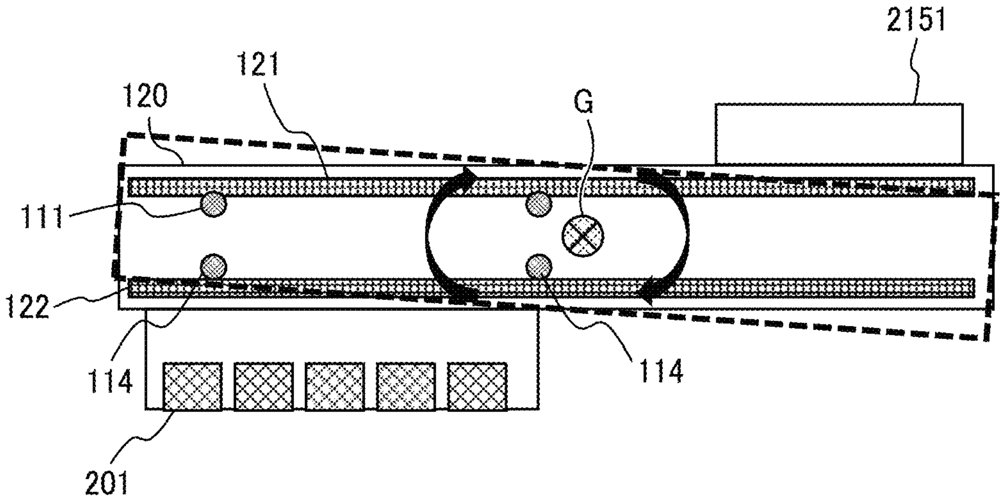
FIG. 6 is a diagram illustrating an issue of the liquid discharge head angle adjuster of FIGS. 5A and 5B.

For example, if the state illustrated in FIG. 5B is shifted to the state illustrated in FIG. 5A, the center of gravity G of the array member 120 is displaced from a position between the V rollers 111 which support the V rail 121 at two locations in a longitudinal direction of the array member 120, and moves to a farther rear side than the V roller 111 on the rear side. Accordingly, as illustrated in FIG. 6, a rotational moment is generated such that the end portion on the front side of the array member 120 is lifted and the end portion on the rear side is lowered.

In other words, a rotational moment in a clockwise direction (CW direction) is generated in the array member 120 as seen from the right side of the array member 120 illustrated in FIG. 5A or 5B, and the array member 120 is inclined in the width direction of the drum 211. As a result, when the adjustment roller 113 pushes the side surface of the array member 120 to adjust an angle, the tip of the V roller 111 does not function as a fulcrum. That is, angle adjustment accuracy of the head array 100 is degraded.

Structure for Preventing Array Member 120 from Being Lifted

Figure 7A:
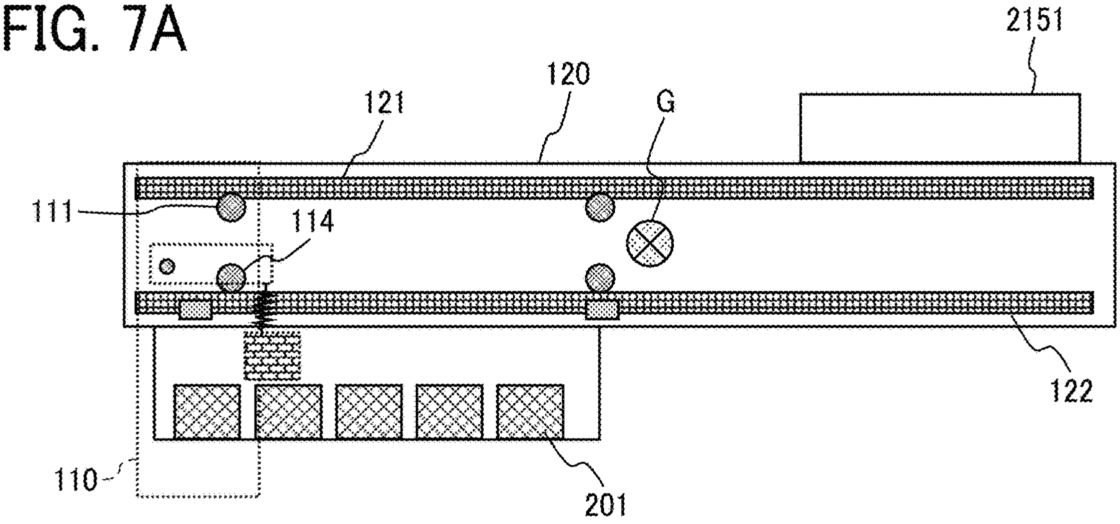
FIGS. 7A, 7B, and 7C are diagrams each illustrating an example of adjustment operation performed by the liquid discharge head angle adjuster according to the embodiment of the present disclosure.
Figure 7B:
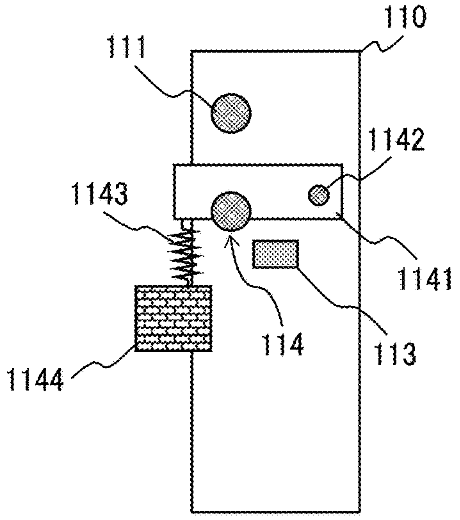
Figure 7C:
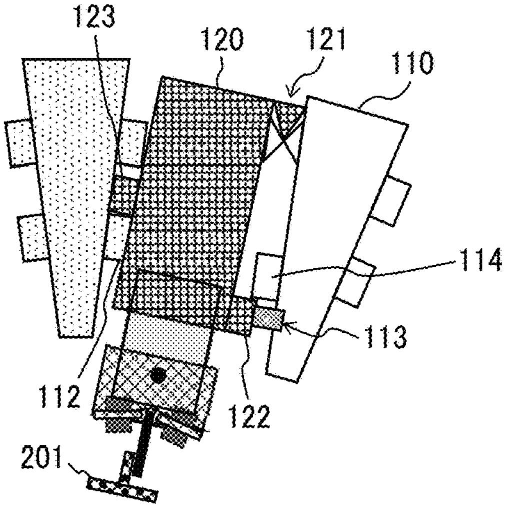

As described with reference to FIG. 6, the rotational moment due to displacement of the center of gravity degrades the function as the first supports formed by the V rollers 111 separately disposed in two locations in a longitudinal direction of the array member 120. To prevent a such a case, the head array 100 according to the present embodiment, as illustrated in FIGS. 7A, 7B, and 7C, includes a structure by which the pressing flat roller 114 urges the adjustment flat rail 122 downward. Hereinafter, the urging structure of the pressing flat roller 114 is described.

Each of FIGS. 7A through 7C is a diagram illustrating the urging structure of the flange 110. FIG. 7A is a right-side view illustrating one portion of the head array 100 from the same direction as FIG. 6. Since the urging structure is disposed on a left surface of the flange 110 as illustrated in FIG. 7B, a description of the urging structure is mainly given with reference to FIG. 7B.

As illustrated in FIG. 7B, the pressing flat roller 114 is disposed on a swing arm 1141. The pressing flat roller 114 is rotatable with respect to the swing arm 1141. The swing arm 1141 rotates about a rotation center 1142 as a spindle fixed to the flange 110. The swing arm 1141 is urged by an elastic member 1143 in a CCW direction in FIG. 7B with respect to the flange 110 disposed on the front side of the array member 120.

The elastic member 1143 is, for example, a tension spring. One end portion of the elastic member 1143 is fixed to an end portion of the swing arm 1141, and the other end portion of the elastic member 1143 is fixed to a fixation portion 1144 disposed on one portion of the flange 110.

An urging force of the elastic member 1143 as an urging member can be set according to size of an inclination angle of the array member 120 with respect to a radial direction of the drum 211. For example, if a plurality of array members 120 has different inclination angle, an elastic member 1143 that provides an urging force necessary for an array member 120 having a larger inclination angle can be used.

As described above, if the center of gravity is positioned in the rear of the array member 120, a rotational moment by which the front (the front side) of the array member 120 tends to rotate in a CW direction in FIG. 7A is generated. Since the urging by the elastic member 1143 is applied in an opposite direction with respect to the rotational moment, the pressing flat roller 114 attached to the swing arm 1141 is pressed against the adjustment flat rail 122.

As a result, the adjustment flat rail 122 is pushed downward, and the V rail 121 is pushed against the V roller 111 of the flange 110.

With such action, the contact of the V roller 111 with the V rail 121 becomes reliable, and thus a contact position of the V rail 121 with respect to the V roller 111 can function as a rotation fulcrum of the array member 120. As a result, when a lower portion of the array member 120 is pushed sideward by using the adjustment roller 113, the accuracy of the rotation of the array member 120 can be enhanced, and the accuracy of the rotation angle adjustment of the array member 120 can be enhanced. Hence, an axial center of the array member 120 can be adjusted with good accuracy.

A position of the center of gravity of the array member 120 changes depending on a configuration such as the control board 2151, a power circuit, and wiring to be arranged. Thus, an urging force can be adjusted according to movement of the position of the center of gravity. For example, the elastic member 1143 may be changed to change an urging force to an appropriate value, or a position of the fixation portion 1144 may be changed to adjust an urging force.

The greater the inclination angle of the array member 120, the greater the lift-up amount of the V rail 121 with respect to the V roller 111. Accordingly, an urging force (a pressing force) by the elastic member 1143 needs to be increased. If an urging force is set to an urging force necessary for an array member 120 having a larger inclination angle, a functional effect of the pressing member can be obtained in all the array members 120 regardless of inclination angles.

Detail of Adjustment Roller 113

Figure 8A:
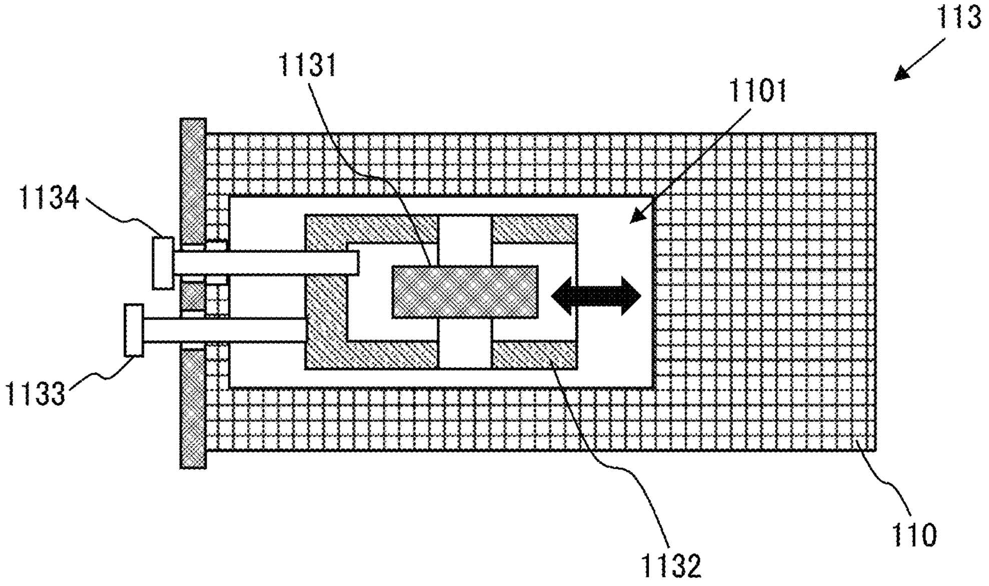
FIGS. 8A and 8B are diagrams each illustrating an example of an angle adjuster in the liquid discharge head angle adjuster.
Figure 8B:
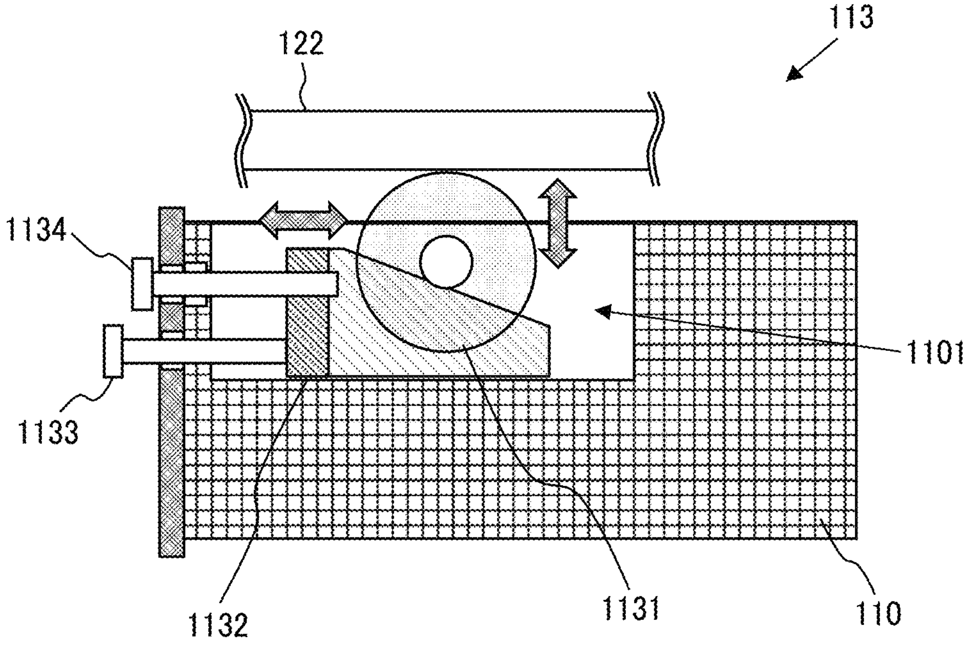

A structure of the adjustment roller 113 is described in detail with reference to FIGS. 8A and 8B. FIG. 8A is a diagram illustrating a cross section of the right surface side of the adjustment roller 113. FIG. 8B is a cross-sectional view of the adjustment roller 113.

As illustrated in FIGS. 8A and 8B, the adjustment roller 113 is disposed to be slidable in a front direction and a depth direction in an adjustment roller groove 1101 formed inside the flange 110. The adjustment roller 113 is configured such that an amount of projection toward the adjustment flat rail 122 of the array member 120 from a side of the flange 110 changes according to an amount of movement toward a depth direction from the front side.

As illustrated in FIG. 8A, the adjustment roller 113 includes a moving roller 1131 that is rotatably disposed with respect to a roller moving wedge 1132 inside the adjustment roller groove 1101. The roller moving wedge 1132 has a wall against which a wedge pressing screw 1133 is pressed. In addition, a wedge return screw 1134 is screwed into the roller moving wedge 1132.

As illustrated in FIG. 8B, if the wedge pressing screw 1133 is screwed, the roller moving wedge 1132 is pushed, and the adjustment roller groove 1101 moves in the depth direction. The roller moving wedge 1132 has a shape that is tapered from the front side toward the depth direction, and an inclined surface of the roller moving wedge 1132 is in contact with a spindle (a rotation shaft) of the moving roller 1131. Thus, if the roller moving wedge 1132 is moved in the depth direction, the inclined surface of the roller moving wedge 1132 pushes the spindle of the moving roller 1131 toward the adjustment flat rail 122.

That is, a projection amount of the moving roller 1131 changes according to a screwing amount of the wedge pressing screw 1133. In a case where a projection amount of the moving roller 1131 is reduced to move the moving roller 1131 away from the adjustment flat rail 122, a screwing amount of the wedge return screw 1134 can be adjusted.

Therefore, since the adjustment roller 113 can adjust a pushing amount for the adjustment flat rail 122 with good accuracy, a rotation angle of the array member 120 can be adjusted with good accuracy.

Figure 9:
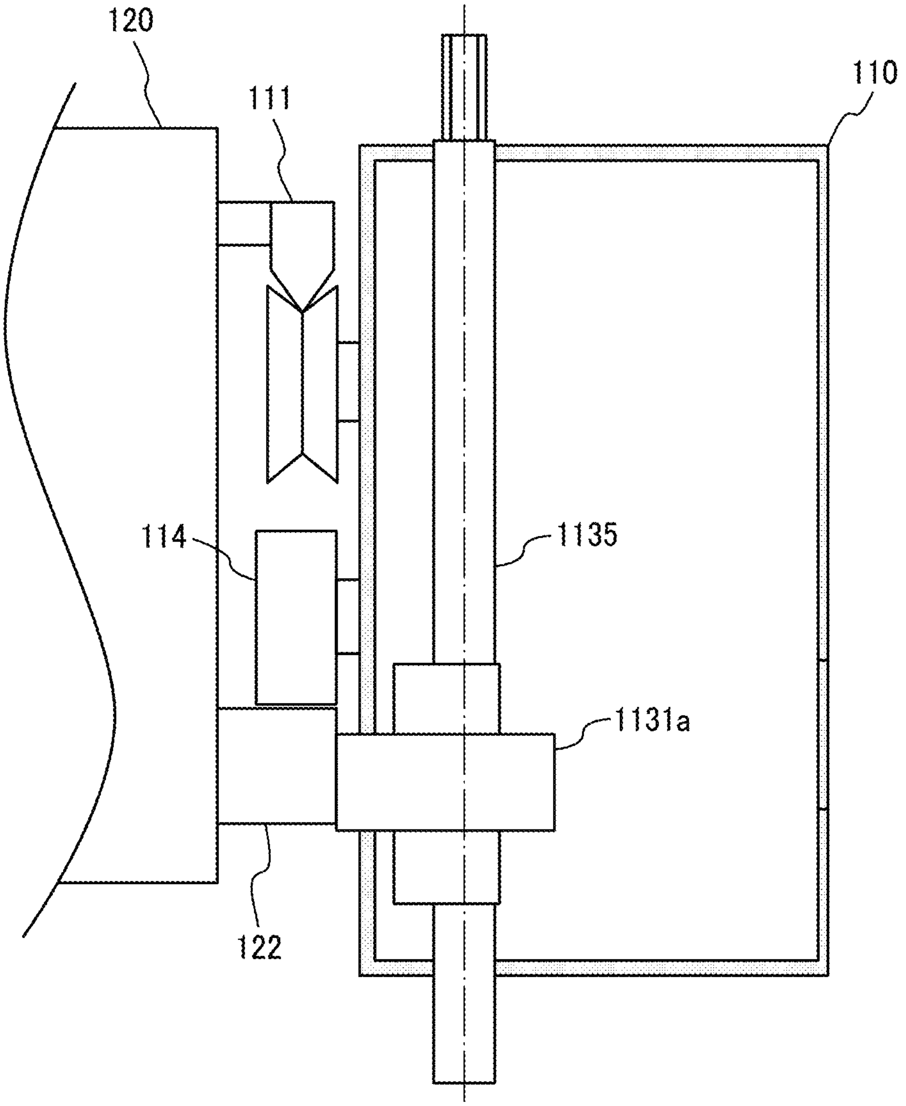
FIG. 9 is a diagram illustrating another example of the angle adjuster in the liquid discharge head angle adjuster.

As illustrated in FIG. 9, a moving roller 1131*a* as a device that adjusts a projection amount of the adjustment roller 113 may be disposed on an eccentric shaft 1135 disposed in a vertical direction of the flange 110. In such a case, adjustment of a rotation angle of the eccentric shaft 1135 can adjust a projection amount of the moving roller 1131.

Detail of V Roller 111

Next, the V roller 111 as an angle adjuster disposed in the head array 100 according to the present embodiment is further described.

Figure 10A:
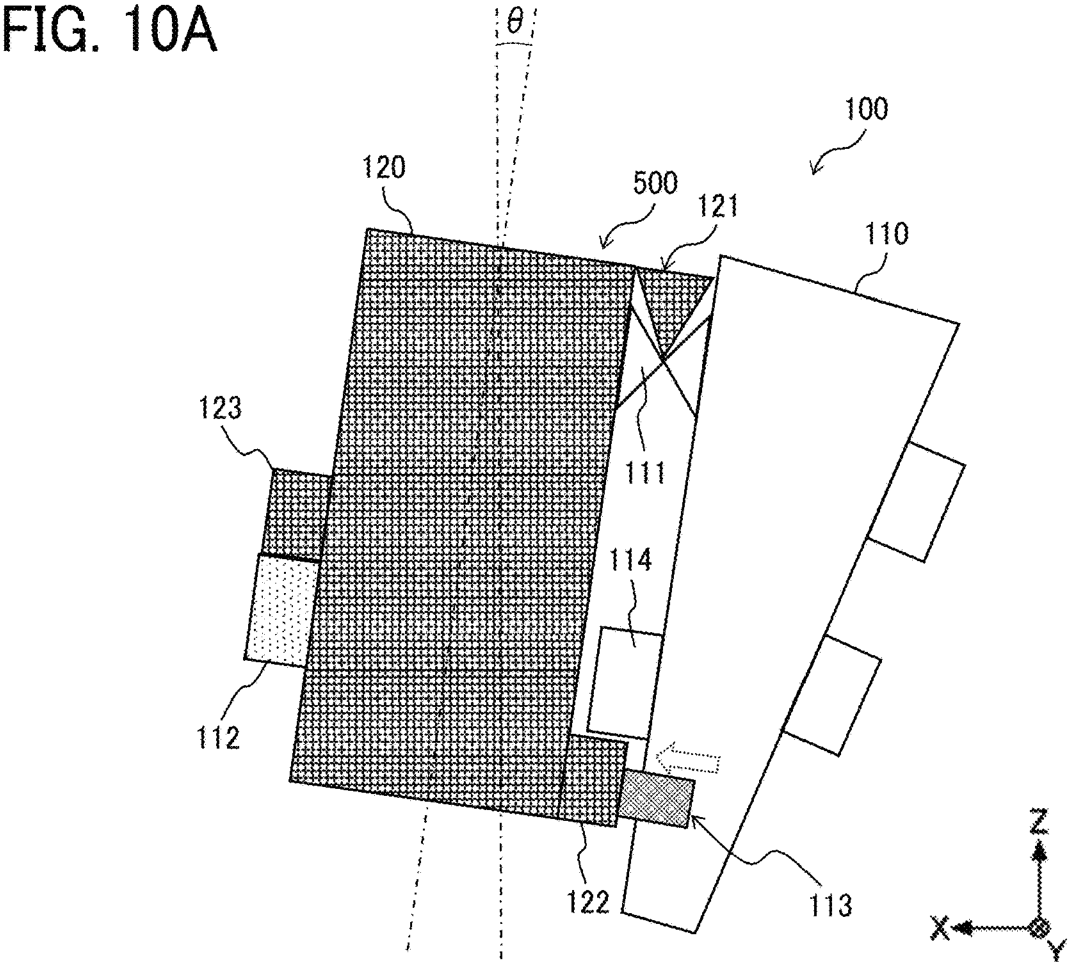
FIGS. 10A, 10B, and 10C are diagrams each illustrating an issue in the liquid discharge head angle adjuster.

As described above, the array member 120 of the head array 100 is inserted between the flanges 110 which are arranged in a state in which the flanges 110 are inclined at predetermined angles relative to a horizontal plane. Thus, as illustrated in FIG. 10A, the array member 120 is inclined at an angle corresponding to the insertion location, and a load of the array member 120 is supported while the inclination state is being retained by the V roller 111 and the support flat roller 112. Herein, the adjustment roller 113 is separated from the adjustment flat rail 122 disposed in the array member 120.

Figure 10B:
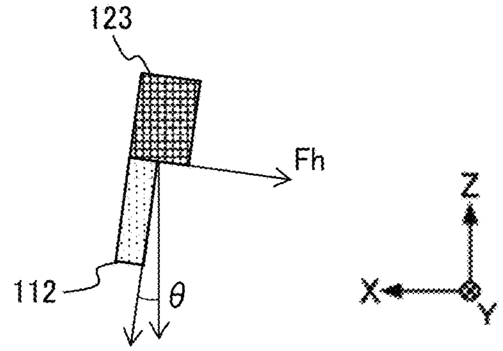

Immediately after insertion of the array member 120, a load of the supported flat rail 123, which is supported by the support flat roller 112, with respect to the support flat roller 112 is applied as illustrated in FIG. 10B in which a surface direction component force Fh as a component force of an array load F by a weight of the array member 120 is applied.

Figure 10C:
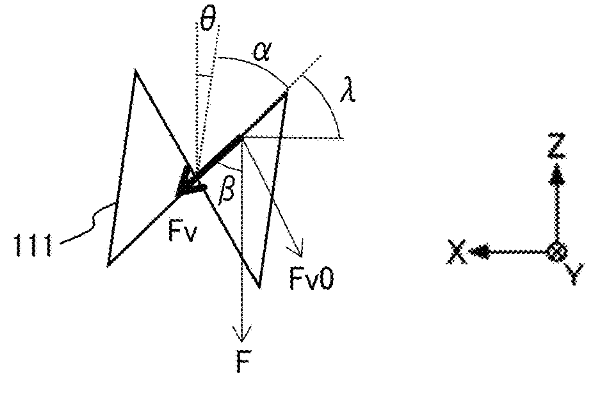

Moreover, as illustrated in FIG. 10C, an inclined surface direction component force Fv is applied to the V roller 111 by the array load F.

Figure 11A:
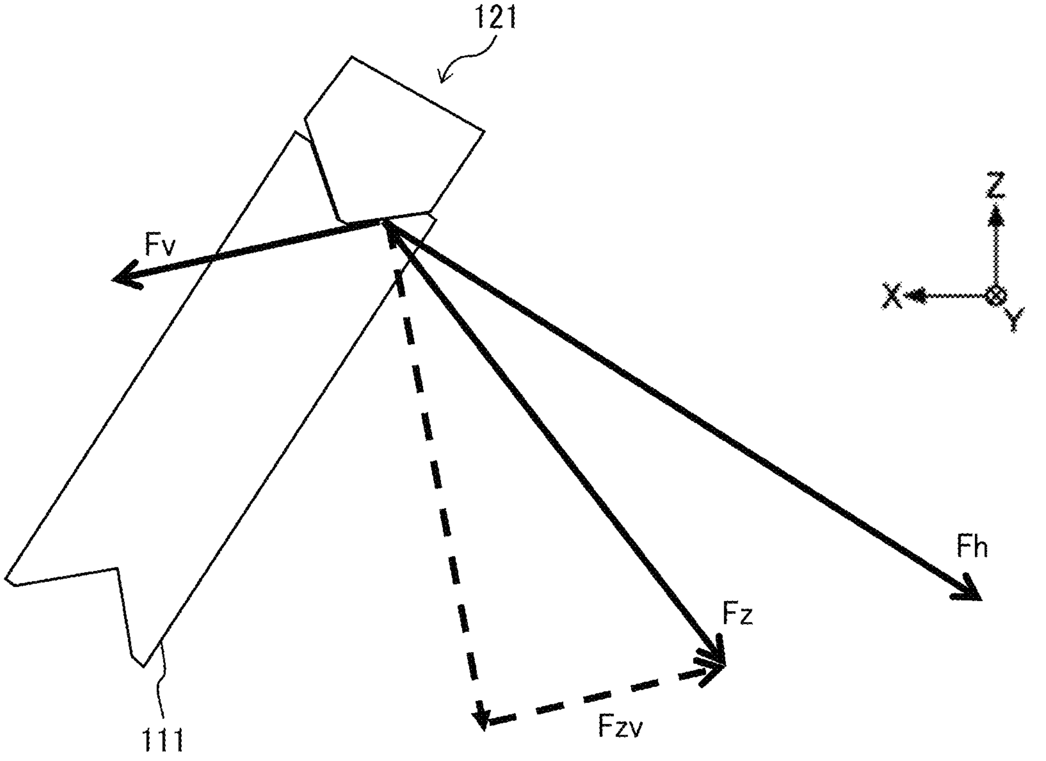
FIGS. 11A and 11B are diagrams each illustrating an issue in the liquid discharge head angle adjuster.
Figure 11B:
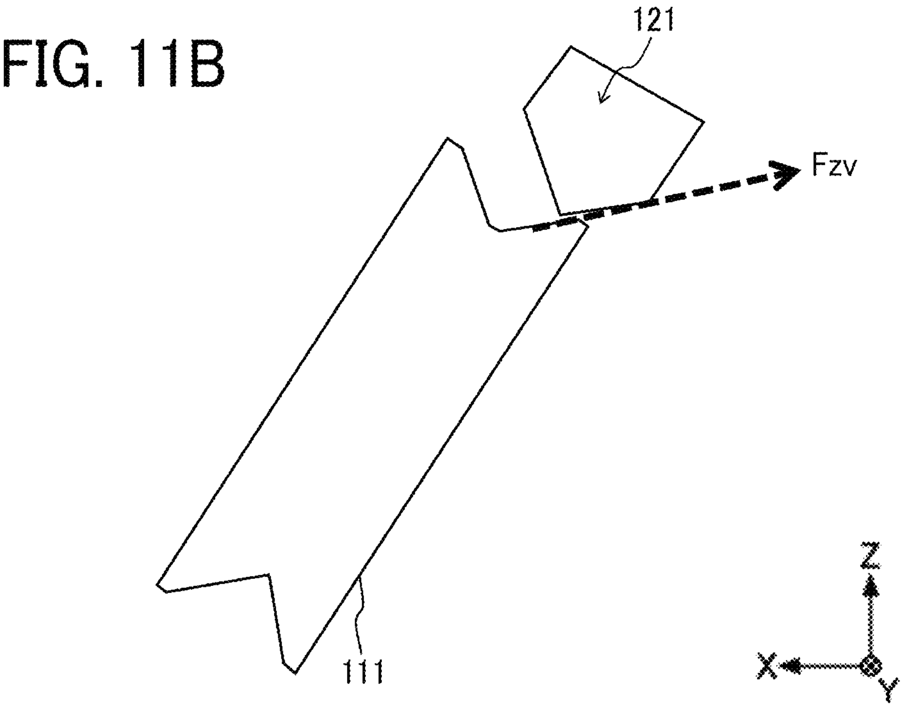

Then, as illustrated in FIG. 11A, a resultant force Fz of the surface direction component force Fh and the inclined surface component force Fv causes an inclined surface component force Fzv that is applied to the inclined surface of the V roller 111 to be directed toward the outside of the V roller 111 as indicated by a broken-line arrow. The inclined surface component force Fzv, as illustrated in FIG. 11B, is a force that acts such that the V rail 121 slides outward from the V roller 111.

Thus, an angle of the inclined surface of the V roller 111 needs to be defined to prevent removal of the V rail 121 from the V roller 111 due to the inclined surface component force Fzv.

An angle of one of the inclined surfaces of the V roller 111 needs to be defined. Accordingly, an inclination angle with respect to a horizontal plane of the array member 120 is set "θ", and a half value of the inclined surface of the V roller 111 is set to "α". In this case, an angle "β" that is used for calculation of the inclined surface direction component force Fv of the V roller 111 is calculated by Expression 1.

$$\beta=\theta+\alpha \qquad \text{Expression 1}$$

Using Expression 1, a V roller inclined surface limit angle "λ" as an angle to be a threshold value at which the V rail 121 is not removed from the V roller 111 is calculated by Expression 2.

$$\lambda=90\ \text{degrees}-\theta(\text{array inclination of 33 degrees})-\alpha(\text{V roller angle of 75 degrees/2}) \quad \text{Expression 2}$$

According to Expression 2, a lower limit of a threshold angle is "19.5 degrees".

If an angle of a tip portion of the V roller 111 is set between 10 degrees to 15 degrees, an upper limit of the inclination angle of the V roller 111 is estimated to be 30 degrees. In this case, if Expression 2 is used to calculate an upper limit of a threshold angle, Expression 3 is provided.

$$\lambda=90\ \text{degrees}-\theta(\text{array inclination of 33 degrees})-\alpha(\text{V roller angle of 30 degrees/2}) \quad \text{Expression 3}$$

According to Expression 3, an upper limit of the threshold angle is "49.5 degrees". Thus, the upper limit is roughly 50 degrees.

Therefore, a preferable value of the V roller inclined surface limit angle "λ" as an angle in a range within which the V rail 121 is not removed from the V roller 111 falls within a range of 19.5 degrees to 50 degrees.

In the head array 100 according to the present embodiment, even if the array member 120 is inclined at 33 degrees or more, the V rail 121 is not removed from the V roller 111 as long as an inclination angle of the inclined surface of the V roller 111 as the first support is 19.5 degrees or greater relative to a horizontal plane.

An angle of the V roller 111 is suitably greater than an angle formed by the two inclined surfaces of the V rail 121. A tip of the V rail 121 provided in a groove of the V roller 111 serves as a rotation fulcrum to suitably swing the array member 120.

The V roller 111 disposed in the head array 100 according to the present embodiment is further described with reference to FIGS. 12A and 12B. As described above, a value of the V roller inclined surface angle "λ" can be set to a range of 19.5 degree to 50 degrees. Such a value of "λ" is, as described above, adjusted and set according to a movement amount of the adjustment roller 113.

Figure 12A:
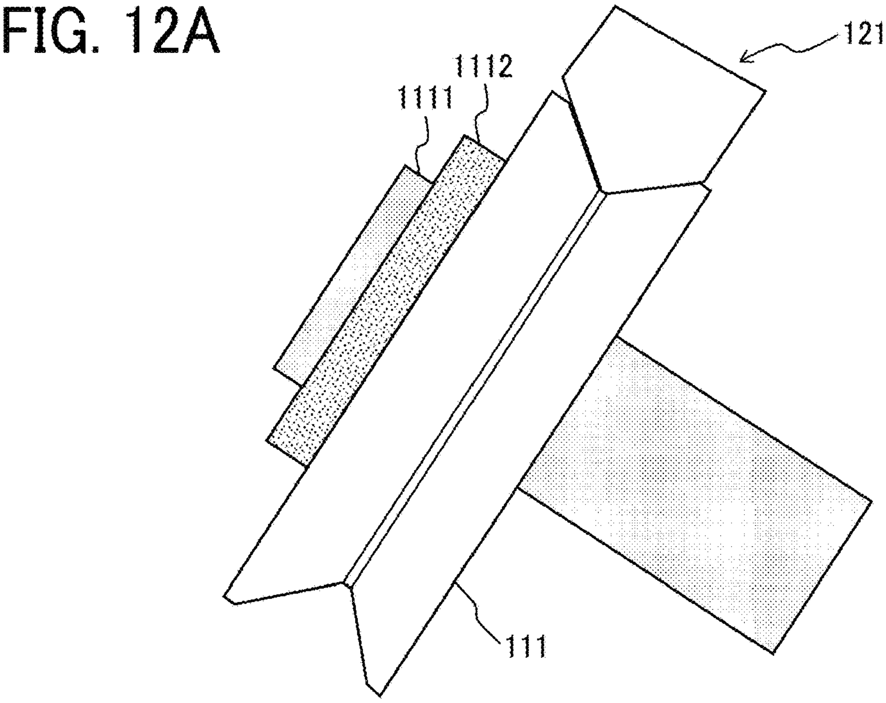
FIGS. 12A and 12B are diagrams each illustrating a configuration that resolves the issue in the liquid discharge head angle adjuster.
Figure 12B:
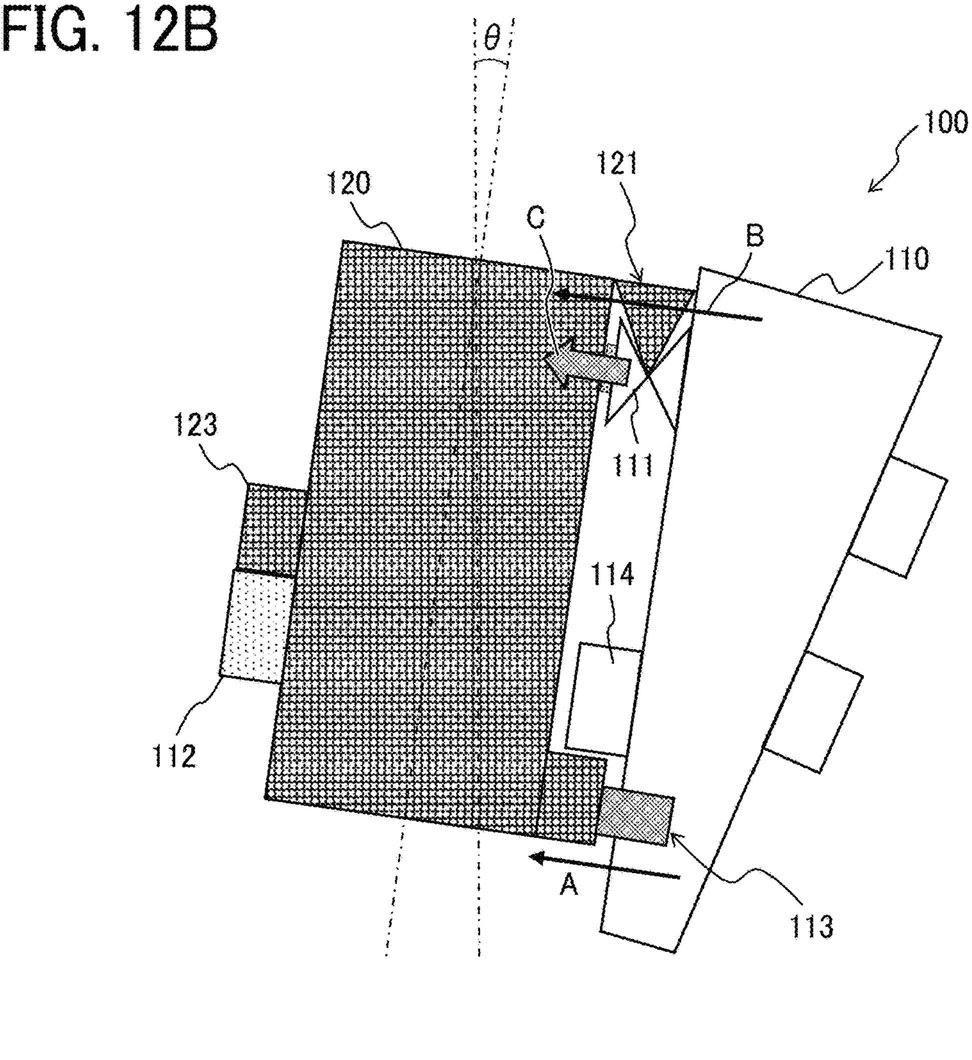

The adjustment roller 113 is moved in a direction indicated by an arrow A illustrated in FIG. 12B to adjust the axial center of the array member 120. Accordingly, a force in a direction indicated by an arrow B with respect to the V roller 111 is applied to the V rail 121. As a result, a force in a direction indicated by an arrow C is applied to the V roller 111 as a rotator. The arrow C represents a direction moving away from a rotation shaft. That is, if an axial center of the array member 120 is adjusted using the adjustment roller 113, rotation of the array member 120 applies a force to the V rail 121 supported by the V roller 111 in a direction away from the flange 110.

After the axial center adjustment using the adjustment roller 113 is finished, the array member 120 is supported by the V roller 111 and the adjustment roller 113, and a load of the array member 120 is barely applied to the support flat roller 112. Thus, the support flat roller 112 and the supported flat rail 123 are simply in contact with each other or are separated with several millimeters.

In such a state, if a force in a rotation axis direction of the V roller 111 is being applied to the V roller 111, rotation of the V roller 111 is hindered. That is, the V roller 111 enters "a non-smooth rotation" state. Since the force is applied in a direction in which the V rail 121 is pressed against the V roller 111 to adjust an angle of the array member 120, the V roller 111 desirably makes smooth rotation.

Thus, the V roller 111 according to the present embodiment as illustrated in FIG. 12A includes a locking brim 1111 as a movement restrictor on an end portion of the rotation shaft. The locking brim 1111 restricts movement of the V roller 111 toward the rotation axis direction. In addition, a slide member 1112 is disposed between the locking brim 1111 and a side surface of the V roller 111 to avoid hindrance of smooth rotation of the V roller 111 due to friction with the locking brim 1111. The slide member 1112 is disposed such that a friction coefficient becomes smaller than a metal-to-metal friction coefficient.

For the slide member 1112, a thrust bearing or a slide bearing can be used. The use of the slide member 1112 can prevent an increase in friction resistance due to an external force (a force toward the rotation axis direction) to the V roller 111 by adjustment of an angle of the array member 120.

As described above, in the discharge array according to the present embodiment, since adjustment of the axial center of the array member 120 applies a force to the V roller 111 as the first support in a direction moving away from the rotation shaft, the locking brim 1111 and the slide member 1112 are disposed to the V roller 111. Such a configuration can eliminate or reduce an increase in friction resistance and enables the array member 120 to be pulled out more easily while preventing the V roller 111 from moving away.

The description has been given based on the premise that contact of the V rail 121 with the V roller 111 represents a case in which a tip portion of the V rail 121 contacts a valley portion surrounded by two inclined surfaces of the V roller 111 as a point. However, contact of the V rail 121 with the V roller 111 is not limited thereto.

Figure 13:
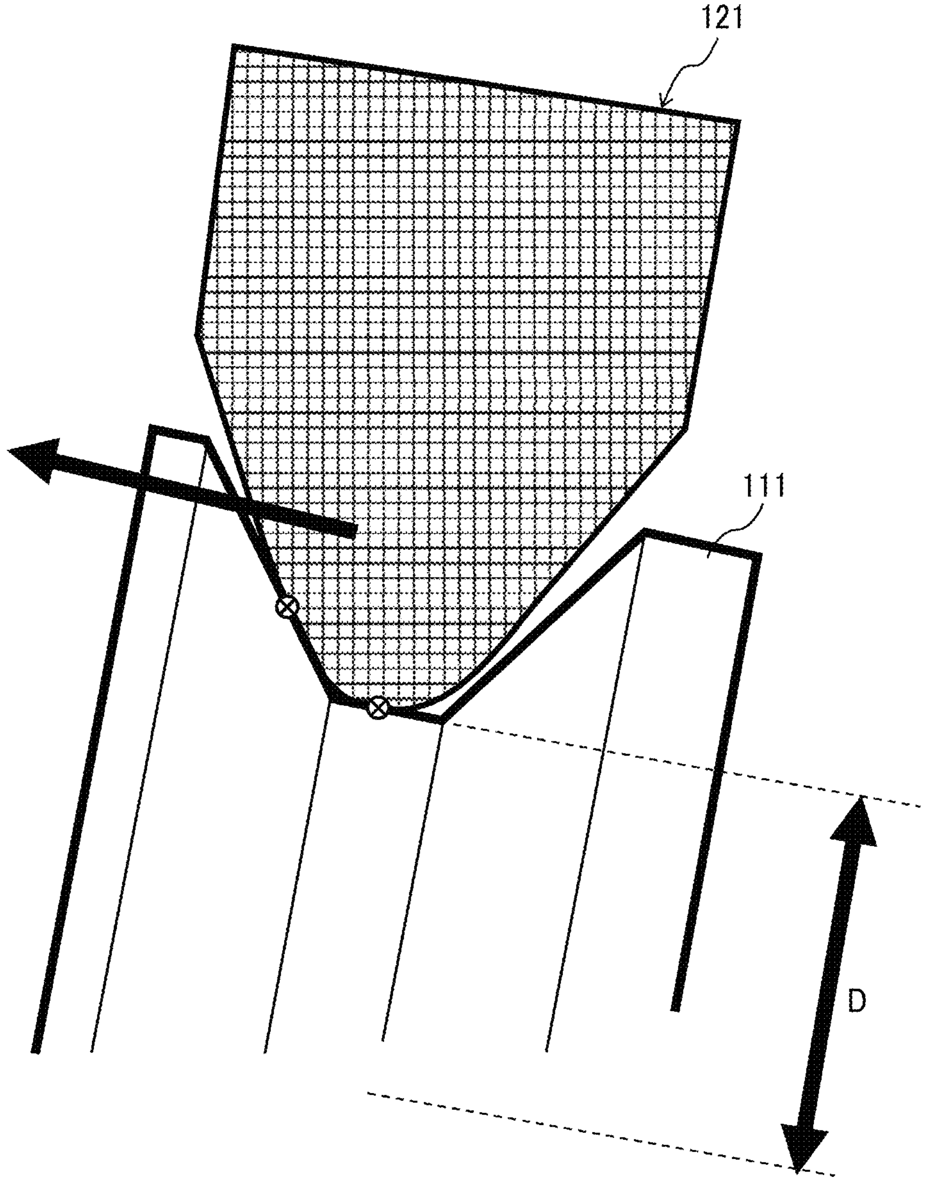
FIG. 13 is a diagram illustrating a configuration that resolves the issue in the liquid discharge head angle adjuster.

For example, as illustrated in FIG. 13, in a longitudinal section of the V roller 111, a valley portion surrounded by two inclined surfaces of the V roller 111 may be flat. In such a case, a tip portion of the V rail 121 can have a rounded curved shape that is rounded from a sharp tip shape.

In such a case, the V rail 121 contacts not only the inclined surface of the V roller 111 as a point, but also the flat area of the valley portion as a point, that is, the V rail 121 contacts the V roller 111 at two locations. As a result, even if a force that presses the V rail 121 against the V roller 111 is generated, a load to the V roller 111 can be reduced.

Moreover, since the V rail 121 is supported by the flat area of the V roller 111, a position of the V rail 121 in a height direction can be determined.

Therefore, in the head array 100 according to the present embodiment, a tip portion of the V rail 121 that contacts a groove of the V roller 111 has a round shape, so that a contact area can be increased. As a result, a load to the bottom of the V roller 111 can be reduced.

In addition, the V rail 121 is supported by a flat area of the V roller 111, so that the V rail 121 can be positioned in a height direction (a direction indicated by an arrow D in FIG. 13) and an operator can determine the correct position of the V rail 121 in the height direction. The V rail 121 is also supported by an inclined surface of the V roller 111, so that a force can be dispersed. As a result, a load to the V roller 111 can be reduced.

The present disclosure has been described above with reference to specific embodiments but is not limited thereto. Various modifications and enhancements are possible without departing from scope of the disclosure. It is therefore to be understood that the present disclosure may be practiced otherwise than as specifically described herein. For example, elements and/or features of different illustrative embodiments may be combined with each other and/or substituted for each other within the scope of the present disclosure.

What is claimed is:

1. A liquid discharge head angle adjuster for individually adjusting inclination angles of a plurality of liquid discharge heads, the liquid discharge head angle adjuster comprising:

a plurality of arrays to hold the liquid discharge heads; and a plurality of array supports to support the arrays, at least one of the array supports including:

a first support disposed on one side in a direction in which one of the liquid discharge heads is rotated when an inclination angle of the one of the liquid discharge heads is adjusted, and to support a rotation fulcrum of one of the arrays;

a second support disposed on a side opposite the first support and to support another of the arrays; and a press to press the rotation fulcrum against the first support, wherein the first support is a rotator rotatably disposed with respect to the at least one of the array supports, and includes a movement restrictor to restrict movement in a rotation axis direction, and wherein a friction coefficient between the rotator and the movement restrictor is smaller than a friction coefficient between pieces of iron.

2. The liquid discharge head angle adjuster according to claim 1, wherein the press is disposed on an end portion of the at least one of the array supports, the end portion being away from center of gravity of the one of the arrays in a longitudinal direction of the one of the arrays.

3. The liquid discharge head angle adjuster according to claim 1, wherein the first support has two inclined surfaces, and wherein, out of the two inclined surfaces, an inclined surface that contacts the one of the arrays when the one of the arrays is supported by the first support has an angle of 19.5 degrees or greater relative to a horizontal plane.

4. The liquid discharge head angle adjuster according to claim 3, wherein an angle formed by the two inclined surfaces of the first support is greater than an angle of the rotation fulcrum.

5. The liquid discharge head angle adjuster according to claim 1, wherein the rotation fulcrum has a tip that is a curved surface.

6. The liquid discharge head angle adjuster according to claim 1, wherein the first support includes two inclined surfaces and a bottom surface between the two inclined surfaces, and wherein the rotation fulcrum is in contact with the first support on the bottom surface and one of the two inclined surfaces.

7. A liquid discharge module comprising:

the liquid discharge head angle adjuster according to claim 1; and the plurality of liquid discharge heads to discharge liquid to a medium.

8. A liquid discharge apparatus comprising:

the liquid discharge head angle adjuster according to claim 1;

a drum to convey a medium; and the plurality of liquid discharge heads disposed on an outer circumferential surface of the drum and to discharge liquid to the medium.

9. The liquid discharge head angle adjuster according to claim 1, wherein the press includes an elastic to urge the rotation fulcrum toward a direction in which the rotation fulcrum is pressed against the first support, and an urging force by the clastic is set according to size of an inclination angle of each of the arrays.

10. A liquid discharge head angle adjuster for individually adjusting inclination angles of a plurality of liquid discharge heads, the liquid discharge head angle adjuster comprising:

a plurality of arrays to hold the liquid discharge heads; and a plurality of array supports to support the arrays, at least one of the array supports including:

a first support disposed on one side in a direction in which one of the liquid discharge heads is rotated when an inclination angle of the one of the liquid discharge heads is adjusted, and to support a rotation fulcrum of one of the arrays;

a second support disposed on a side opposite the first support and to support another of the arrays; and a press to press the rotation fulcrum against the first support, wherein the press includes an elastic to urge the rotation fulcrum toward a direction in which the rotation fulcrum is pressed against the first support, and an urging force by the elastic is set according to size of an inclination angle of each of the arrays.

11. The liquid discharge head angle adjuster according to claim 10, wherein the press is disposed on an end portion of the at least one of the array supports, the end portion being away from center of gravity of the one of the arrays in a longitudinal direction of the one of the arrays.

12. The liquid discharge head angle adjuster according to claim 10, wherein the first support has two inclined surfaces, and wherein, out of the two inclined surfaces, an inclined surface that contacts the one of the arrays when the one of the arrays is supported by the first support has an angle of 19.5 degrees or greater relative to a horizontal plane.

13. The liquid discharge head angle adjuster according to claim 12, wherein an angle formed by the two inclined surfaces of the first support is greater than an angle of the rotation fulcrum.

14. The liquid discharge head angle adjuster according to claim 10, wherein the rotation fulcrum has a tip that is a curved surface.

15. The liquid discharge head angle adjuster according to claim 10, wherein the first support includes two inclined surfaces and a bottom surface between the two inclined surfaces, and wherein the rotation fulcrum is in contact with the first support on the bottom surface and one of the two inclined surfaces.

16. A liquid discharge module comprising:

the liquid discharge head angle adjuster according to claim 10; and the plurality of liquid discharge heads configured to discharge liquid to a medium.

17. A liquid discharge apparatus comprising:

the liquid discharge head angle adjuster according to claim 10;

a drum configured to convey a medium; and the plurality of liquid discharge heads disposed on an outer circumferential surface of the drum and configured to discharge liquid to the medium.

* * * * *